(12) United States Patent
Kriegsfeld et al.

(10) Patent No.: US 11,393,272 B2
(45) Date of Patent: Jul. 19, 2022

(54) SYSTEMS AND METHODS FOR UPDATING AN IMAGE REGISTRY FOR USE IN FRAUD DETECTION RELATED TO FINANCIAL DOCUMENTS

(71) Applicant: MITEK SYSTEMS, INC., San Diego, CA (US)

(72) Inventors: Matthew S. Kriegsfeld, Poway, CA (US); William T. Walker, San Diego, CA (US); Yuriy B. Okrugin, West Orange, NJ (US); Michael E. Diamond, San Diego, CA (US)

(73) Assignee: MITEK SYSTEMS, INC., San Diego, CA (US)

( * ) Notice: Subject to any disclaimer, the term of this patent is extended or adjusted under 35 U.S.C. 154(b) by 504 days.

(21) Appl. No.: 16/582,695

(22) Filed: Sep. 25, 2019

(65) Prior Publication Data

US 2021/0090372 A1    Mar. 25, 2021

(51) Int. Cl.
| | | |
|---|---|---|
| *G07D 7/20* | (2016.01) | |
| *G06Q 20/40* | (2012.01) | |
| *G07D 7/206* | (2016.01) | |
| *G06Q 20/04* | (2012.01) | |

(52) U.S. Cl.
CPC ......... *G07D 7/2083* (2013.01); *G06Q 20/042* (2013.01); *G06Q 20/4016* (2013.01); *G07D 7/206* (2017.05)

(58) Field of Classification Search
CPC .. G06Q 20/042; G06Q 40/02; G06Q 20/0425; G06Q 20/108; G06Q 20/4016; G06Q 30/0185; G06Q 20/401; G06Q 20/4014; G06Q 30/0637; G06V 30/10; G06V 10/20; G06V 20/95; G06V 40/40; G06V 30/418

See application file for complete search history.

(56) References Cited

U.S. PATENT DOCUMENTS

| | | | | |
|---|---|---|---|---|
| 10,373,136 | B1 * | 8/2019 | Pollack | G06Q 20/0425 |
| 10,452,908 | B1 * | 10/2019 | Ramanathan | G06V 10/42 |
| 10,621,660 | B1 * | 4/2020 | Medina | G06Q 20/3276 |
| 2007/0064991 | A1 * | 3/2007 | Douglas | G06Q 20/042 |
| | | | | 382/137 |
| 2007/0244782 | A1 * | 10/2007 | Chimento | G06Q 20/00 |
| | | | | 705/35 |
| 2009/0261158 | A1 * | 10/2009 | Lawson | G07D 7/0047 |
| | | | | 235/379 |

(Continued)

*Primary Examiner* — Dung Hong
(74) *Attorney, Agent, or Firm* — Procopio, Cory, Hargreaves & Savitch LLP

(57) ABSTRACT

A system comprising: a check Image Record (CIR) database configured to store, for each of a plurality of accounts, a CIR, wherein each CIR comprises feature information related to features extracted from a plurality of reference checks associated with the associated account of the plurality of accounts; memory configured to store instructions; and a processor coupled with the CIR database and the memory, the processor configured to run the instructions, which cause the processor to: receive an image of a test check associated with an account of the plurality of accounts, extract feature information from the image, compare the features with the feature information stored in the CIR database for the account associated with the test check, generate a fraud score, and update each CIR by determining.

24 Claims, 11 Drawing Sheets

(56) References Cited

U.S. PATENT DOCUMENTS

| | | | |
|---|---|---|---|
| 2011/0280450 A1* | 11/2011 | Nepomniachtchi | G06V 10/24 382/112 |
| 2014/0046841 A1* | 2/2014 | Gauvin | G06Q 40/02 705/45 |
| 2014/0233837 A1* | 8/2014 | Sandoz | G06F 16/51 382/137 |
| 2018/0101836 A1* | 4/2018 | Nepomniachtchi | G06V 10/243 |

* cited by examiner

Check Processing

MICR-line Test

Front-as-Rear Test

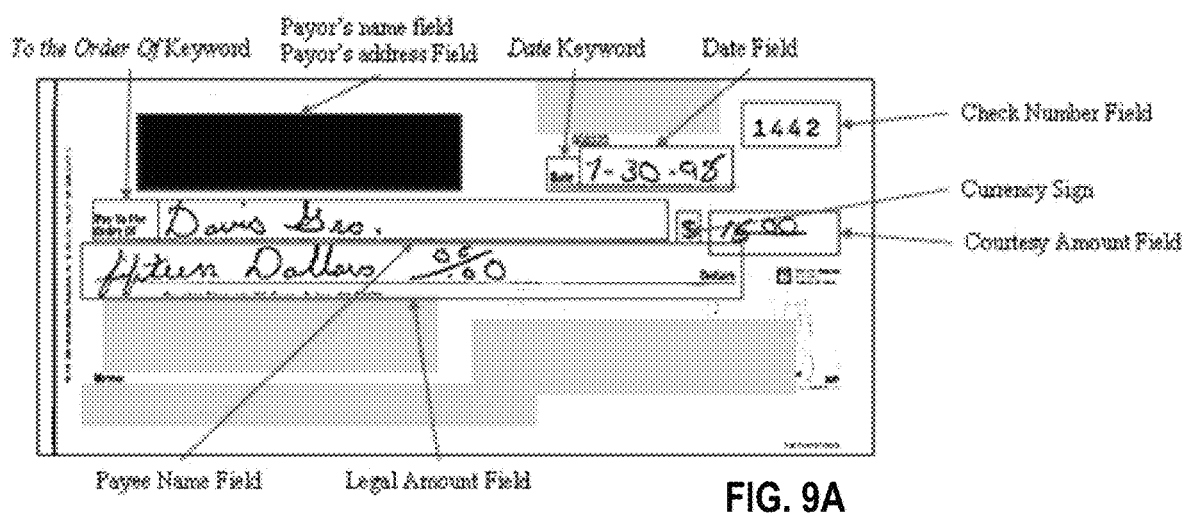
FIG. 9A
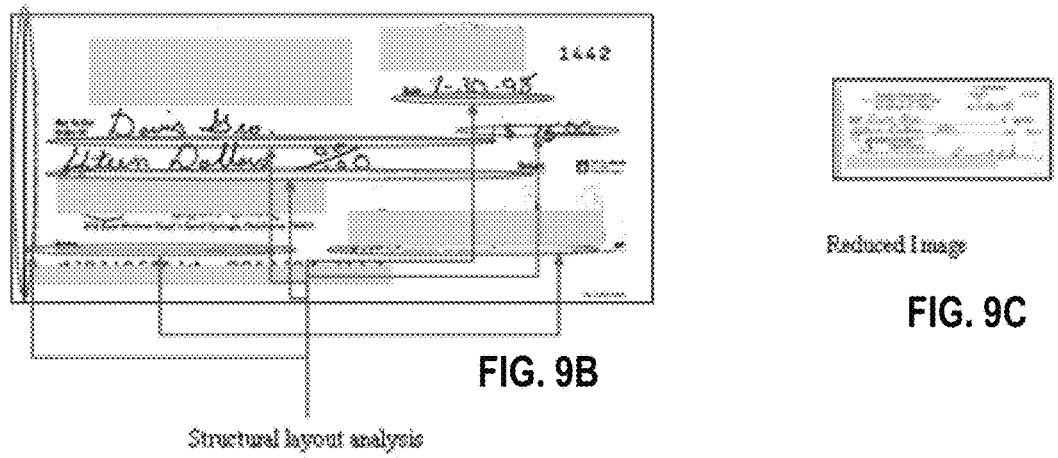
FIG. 9B
Structural layout analysis
Reduced Image
FIG. 9C

Local Fraud Score Calculation (single Detector)

Detector score: function of the minimal distance from the incoming check (F) to ref. checks ($R_j$):

$$S = f(\min\{d(F, R_j)\}), \quad j=1,N; \text{ N is the number of ref. checks in CIR}$$

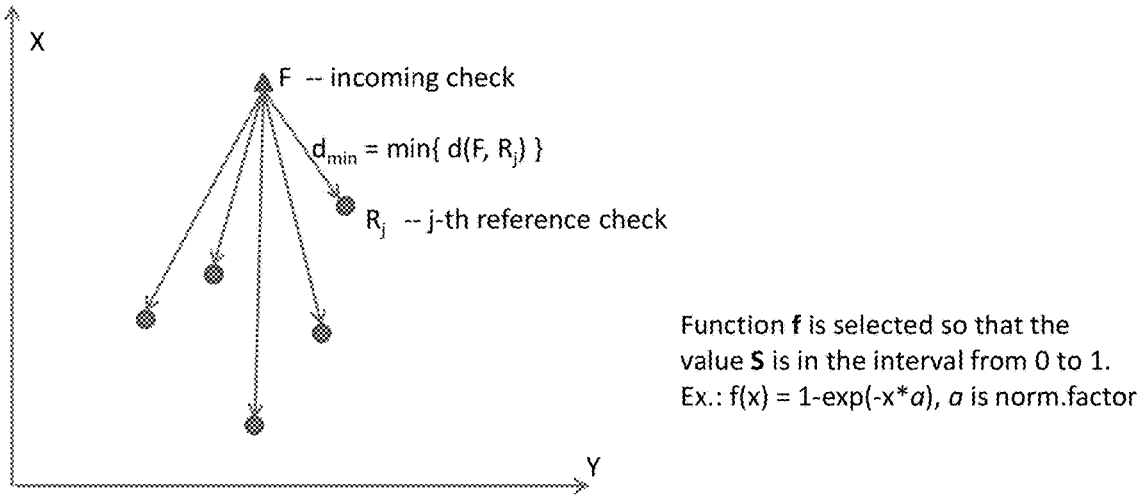

F -- incoming check $d_{min} = \min\{d(F, R_j)\}$ $R_j$ -- j-th reference check

Function f is selected so that the value S is in the interval from 0 to 1.
Ex.: $f(x) = 1-\exp(-x*a)$, $a$ is norm.factor

FIG. 10

SYSTEMS AND METHODS FOR UPDATING AN IMAGE REGISTRY FOR USE IN FRAUD DETECTION RELATED TO FINANCIAL DOCUMENTS

RELATED APPLICATION INFORMATION

This application is related to U.S. patent application Ser. No. 12/778,943, filed on May 12, 2010, now pending; U.S. patent application Ser. No. 12/717,080, filed on Mar. 3, 2010; U.S. patent application Ser. No. 12/346,071, filed on Dec. 30, 2008; and U.S. patent application Ser. No. 12/346,091, filed on Dec. 30, 2008; which are hereby incorporated by reference in their entirety.

BACKGROUND

1. Technical Field

The embodiments described herein relate to processing images of financial documents captured using a mobile device, and more particularly to fraud detection for financial documents captured using a mobile device or other modality.

2. Related Art

Banks and other businesses have become increasingly interested in electronic processing of check and other financial documents in order to expedite processing of these documents. Users can scan a copy of the document using a scanner or copier to create an electronic copy of the document that can be processed instead of a hardcopy original, which would otherwise need to be physically sent to the recipient for processing. For example, some banks can process digital images of checks and extract check information from the image needed to process the check without requiring that the physical check be routed throughout the bank for processing.

Unfortunately, these capabilities have also led to new forms of fraud, where fraudsters, e.g., attempt to deposit fake checks into their accounts. Accordingly, conventional banking systems that are configured to process electronic images of checks now typically incorporate a database that stores Check Identity Records (CIRs). Information from a user's check images are extracted and stored in the CIR. Such information can include:
1. Courtesy Amount Position;
2. Legal Amount Position;
3. Payee name position;
4. Date field position;
5. Address block position;
6. Check Number position;
7. Currency sign position and currency sign image;
8. Keyword "Date" position and image;
9. Key-phrase "To The Order Of" position and image;
10. Handwriting style features of the legal amount (applicable to handwritten checks only);
11. Smoothed and reduced check image;
12. Layout structural features—relative position of straight lines in the check image;
13. Check number/codeline cross validation feature;
14. Payer name position and image; and
15. Client's signature image.

The process is illustrated in FIG. 8A, in which a plurality of reference check images 802a-N related to a user account 804 are received and features 806, such as those listed above are extracted and stored in the CIR database 808. It should be pointed out that the reference checks 802a-N are known to be good, and associated with account 804. The reason a plurality of images are stored is to get a composite CIR that encompasses normal variations in certain features 806. For example, the client's signature image will not always look exactly alike. But the number (N) of reference images should cover normal variations, such that a slight difference in the signature does not cause a fraud detection to occur.

As can be seen in FIG. 8B, once the CIR 808 is created, then when a new check image 803, supposedly associated with account 804 is received, then the same features 805 can be extracted from the new image and compared with the CIR 808. A fraud detection score 810 can then be determined based on the comparison.

The problem with conventional CIR approaches is that the CIR is static and therefore the confidence of the fraud detection is compromised over time.

SUMMARY

Systems and methods for fraud detection for electronic images of checks are described herein.

In one aspect, a system comprises a check Image Record (CIR) database configured to store, for each of a plurality of accounts, a CIR, wherein each CIR comprises feature information related to features extracted from a plurality of reference checks associated with the associated account of the plurality of accounts; memory configured to store instructions; and a processor coupled with the CIR database and the memory, the processor configured to run the instructions, which cause the processor to: receive an image of a test check associated with an account of the plurality of accounts, extract feature information from the image, compare the features with the feature information stored in the CIR database for the account associated with the test check, generate a fraud score, and update each CIR by determining.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 9A-C are images of checks illustrating ROIs that can be used or analyzed in fraud testing;

FIG. 10 is a graph illustrating a local fraud score calculation for a single detector in accordance with one example embodiment.

DETAILED DESCRIPTION

The following detailed description is directed to certain specific embodiments; however, it will be understood that these embodiments are by way of example only and should not be seen as limiting the systems and methods described herein to the specific embodiments, architectures, etc. In this description, reference is made to the drawings wherein like parts are designated with like numerals throughout.

Systems and methods for processing an image of a check captured using a mobile device, such as a mobile phone, are provided. These techniques can be implemented on a mobile device and at a central server, and can be used to identify content on a check and determine whether the check is ready to be processed by a business or financial institution. The system can identify portions of the check—such as the endorsement area—to determine if the check has been properly endorsed. If the check lacks an endorsement, a real time notification can be provided to a user which uploaded the check image so the user can correctly endorse the check and upload a new check image. Additional portions of the check, including the signature line, the addressee field, etc. can be checked to ensure that the check is ready to be deposited by the bank.

Differentiating between characteristics of checks provides additional information to a bank being asked to deposit the check as to the potential risk of the check being fraudulent. The risk of fraudulent checks varies depending on the characteristics of the check, and so a bank can set up various customized rules. If the check has a characteristic that is commonly associated with fraud, the bank may immediately deny the request, or request additional processing of the check image before deciding whether to deposit the check. The user is sent a message if the deposit is denied, and may be provided with instructions to manually deposit the check so that the bank can review the original check.

Content Identification

Figure 1:
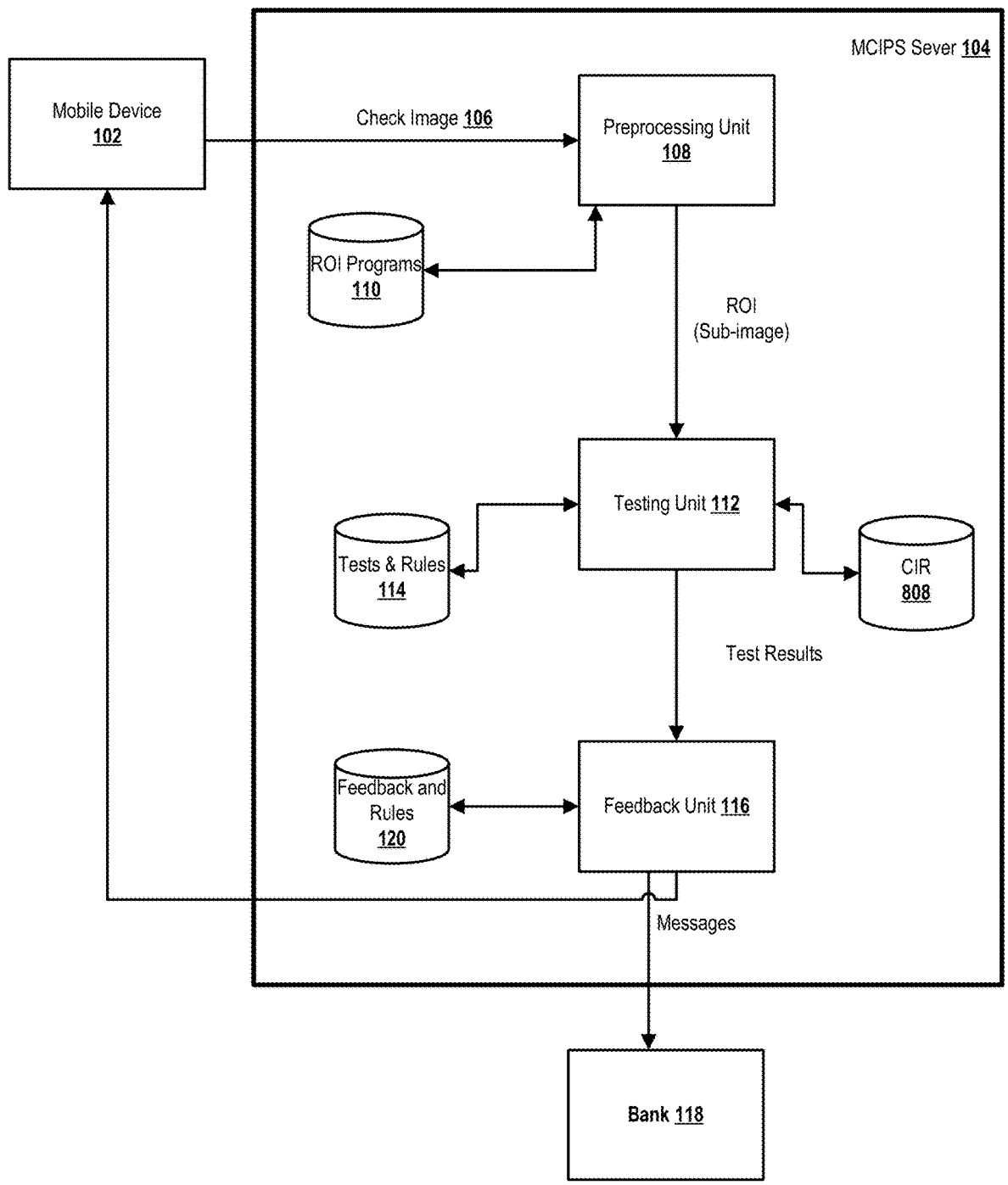
FIG. 1 is a high level block diagram of a system for identifying content in regions of an image of a check captured by a mobile device, according to one exemplary embodiment.

FIG. 1 is a high level block diagram of a system for identifying content in regions of an image of a check captured by a mobile device, according to one exemplary embodiment. A Mobile Check Image Processing System (MCIPS) 100 is shown as a single unit, although one or more of the components of the MCIPS 100 may reside on a mobile device 102 or on an MCIPS server 104 connected with the mobile device through a network (not shown). In the embodiment illustrated in FIG. 1, a user of the mobile device 102 captures an image of a check ("check image") 106 using an image capture device incorporated within the mobile device 102 or connected with the mobile device 102.

The check image 106 may include more than one image file, as the user may need to submit an image of a front side of the check and a back side of the check in order for the check to be deposited with a bank. Also, in some cases more than one image may need to be taken of one side of the check in order to clearly capture the content of the check, so the check image 106 will therefore refer to the one or more images of the check which are submitted to the MCIPS 100. The check image 106 is transmitted from the mobile device 102 to a preprocessing unit 108 at the MCIPS server 104, where the check image 106 is processed to select a type of content to be identified and identify at least one region of interest (ROI) where that type of content would be present.

The ROI will correspond to a particular area of the check that is known to contain specific content, such as an endorsement, a payor name, a payor address, bank account number, routing number, etc. Programs that execute particular algorithms to identify a specific ROI are stored in an ROI programs database 110 connected with the preprocessing unit 108. The preprocessing unit 108 selects one or more programs to run which identify one or more ROIs on the check image 106 that should contain the specific content needed to perform a mobile deposit process. In the embodiments described herein, the ROI may be an endorsement region on a back side of the check where an endorsement is found.

Once the ROIs are identified, the check image 106 is sent to a testing unit 112 to perform one or more content detection tests on the identified ROIs. In one embodiment, the preprocessing unit may send a sub-image of the check image 106 that contains only the identified ROIs in order to streamline the process by sending only the relevant ROIs that need to be tested. Sending the sub-image would be particularly beneficial if the preprocessing unit is located on the mobile device 102 and the testing unit is located on the MCIPS server 104, as the transmission of only the ROIs across a network would take less time.

The testing unit 112 obtains content detection tests from a test and rules database 114 connected with the testing unit 112. The content detection tests are programs that identify specific content in the ROIs, such as an endorsement signature in an endorsement ROI. The content detection tests may identify the presence or absence of particular content or distinguish between one or more types of content in the ROI. For example, an endorsement content detection test may first identify whether an endorsement is present in the endorsement ROI, but will also determine the type of endorsement—such as a hand-written signature or a stamp.

In one embodiment, the content on the check can be manually entered by the user. The check content can be optionally provided by the user at the time that the check is captured. This check content can include various information from the check, such as the check amount, check number, routing information from the face of the check, or other information, or a combination thereof. In some embodiments, a mobile deposition application requests this information from a user of the mobile device, allows the user to capture an image of a check or to select an image of a check that has already been captured, or both, and the mobile deposit information provides the check image, the check content, and other processing parameters to the MCIPS 100.

Once the testing unit performs the appropriate content detection tests, the results of the tests are forwarded to a feedback unit 116 to analyze the results and provide appropriate feedback to the user or to a bank 118. If the endorsement content detection test determines that there is no endorsement on the check, the feedback unit 116 will generate a message to send back to the mobile device 102 telling the user that the endorsement is missing and perhaps requesting that the user endorse the check and upload a new image of the endorsed check. Or, if the endorsement is complete, the feedback unit 116 will generate and send a message to the mobile device 102 indicating that the check is properly endorsed and will be deposited in the user's account. The feedback unit 116 may also generate messages to send to the bank 118 that is receiving the deposited check. For example, the messages may indicate whether the check is ready to be deposited, if a problem has been detected which requires the bank to perform additional processing of the check image, or if the user needs to physically bring the check in.

The feedback unit 116 can generate messages by accessing a feedback message database 120 that stores the messages. The feedback message database 120 can also store rules for generating messages based on the results of the tests performed. In one embodiment, the bank 118 can configure the rules stored in the feedback message database 120 so that certain messages are sent to the bank or the user depending on the results of the tests performed.

The feedback unit 116 can also be configured to take a particular action that coincides with the message that is being delivered to the user or the bank. If an endorsement is not present on the check, the feedback unit 116 can also suspend the mobile deposit process and await a new check image from the user. Once the revised check image is received and the testing unit 112 returns a positive test confirming the presence of an endorsement, the feedback unit 116 reactivates the mobile deposit process and sends a message to the bank 118 that the check is ready to be deposited.

In certain embodiments, the mobile application can display information on the mobile device shortly after the user takes the mobile document image to allow the user to retake the image if the image is found to have defects that affect the overall status of the image. In some embodiments, where the MCIPS 100 is implemented at least in part on the mobile device, the MCIPS 100 can include a user interface module that is configured to display the test results message on a screen of the mobile device 102.

FIG. 1 merely provides a description of the logical components of the MCIPS 100. In some embodiments, the MCIPS 100 can be implemented on the mobile device, in software, hardware, or a combination thereof. In other embodiments, the MCIPS 100 can be implemented on a remote server (not shown), and the mobile device can send the check image 106 e.g., via a wireless interface, to the remote server for processing. The remote server sends the test results and test messages to the mobile device 102 to indicate whether the mobile image passed testing. In some embodiments, part of the functionality of the MCIPS 100 can be implemented on the mobile device 102 while other parts of the MCIPS 100 are implemented on the remote server. The MCIPS 100 can be implemented in software, hardware, or a combination thereof. In still other embodiments, the MCIPS 100 can be implemented entirely on the remote server, and can be implemented using appropriate software, hardware, or a combination thereof.

Figure 2:
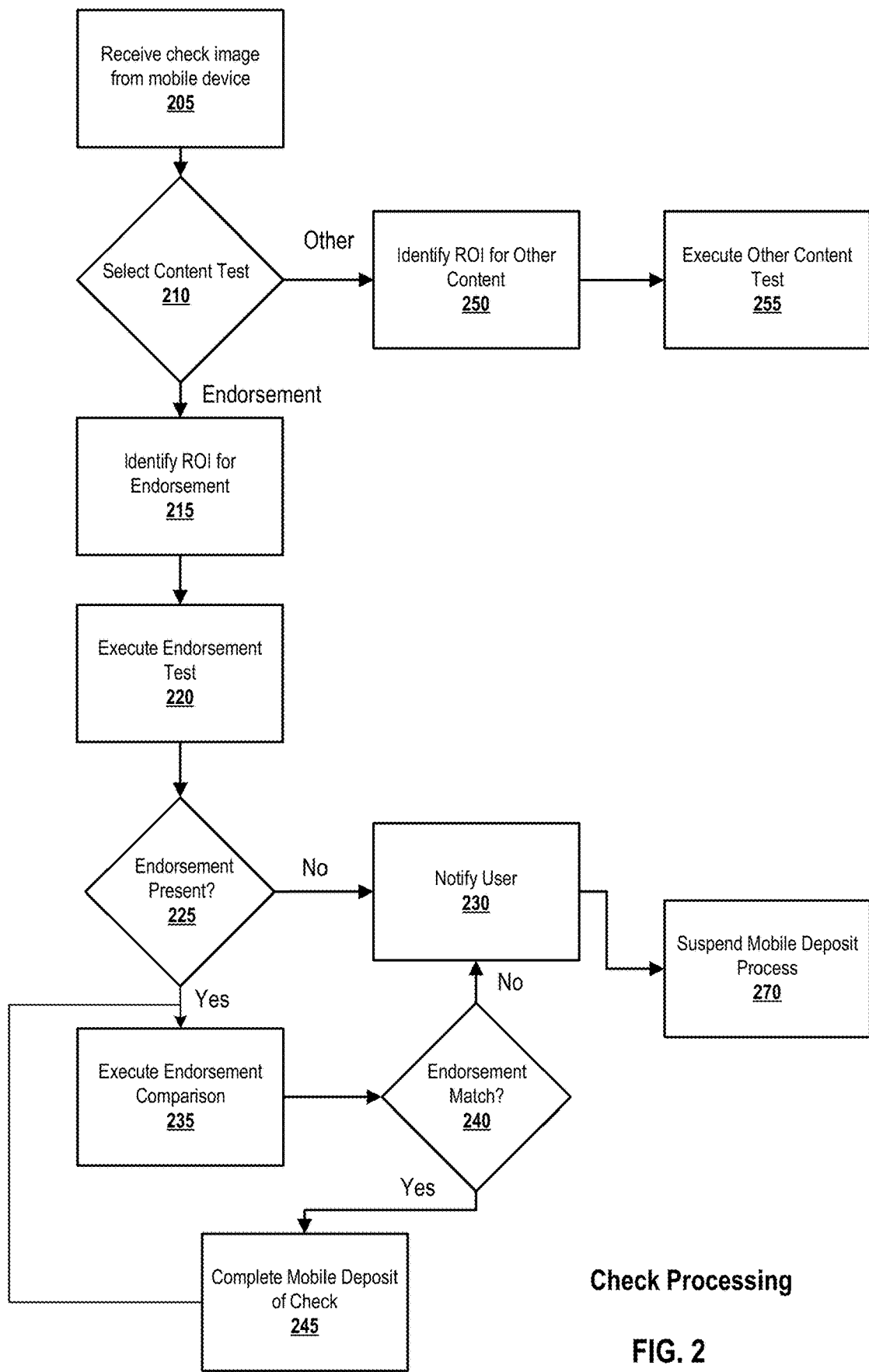
FIG. 2 is a flow diagram of a method for identifying content in regions of an image of a check captured by a mobile device, according to one exemplary embodiment.

FIG. 2 is a flow diagram of a method for identifying content in at least one region of an image of a check captured by a mobile device, according to one exemplary embodiment. In step 205, the check image is received from the mobile device. In step 210, the type of content to be identified is selected—either a test to check for an endorsement or a test to determine other content. In one embodiment, both tests can be selected and run either simultaneously or in sequence.

If the endorsement test is selected ("Endorsement"), the next step is step 215 to identify a region of interest (ROI) where the endorsement would be present on the check. In many situations, the ROI is on the back of the check in an endorsement area (see FIG. 3). Next, in step 220, a content detection test is run on the selected ROI to determine if an endorsement is present. In step 225, the results of the test of whether the endorsement is present are used to determine the next step. If the endorsement is not present, then, in step 230, the user is notified that the check they are attempting to deposit has not been endorsed. This notification may also include instructions to correct the error. Once the user is notified, the mobile deposit process may be suspended (step 270) until another image is submitted.

If the endorsement is present in the ROI, an endorsement comparison test may be executed at step 235, where the identified endorsement is compared with either a signature or stamp stored on the MCIPS server, or where the signature or stamp is compared with the name listed in a payee field (see FIG. 4) on a front area of the check to determine if the person or entity endorsing the check is the same person that the check is addressed to.

In step 240, if the endorsement does not match the stored endorsement or the payee field, the user is notified (step 230) and the mobile deposit process may be suspended (step 270). If the endorsement does match the payee field name or the stored endorsement signature or stamp, the mobile deposit process may be completed in step 245.

If the "Other Type" test is selected at step 210, a region of interest (ROI) on the check image is identified in step 250 where the other type content would be indicated. In step 255, a content detection test is run on the identified ROI to determine characteristics of the other type. Once the characteristics of the other type have been identified, the characteristics are evaluated in step 260 based on processing rules established for the other type. For example, the processing rule could check for a proper signature by a payer.

Figure 3:
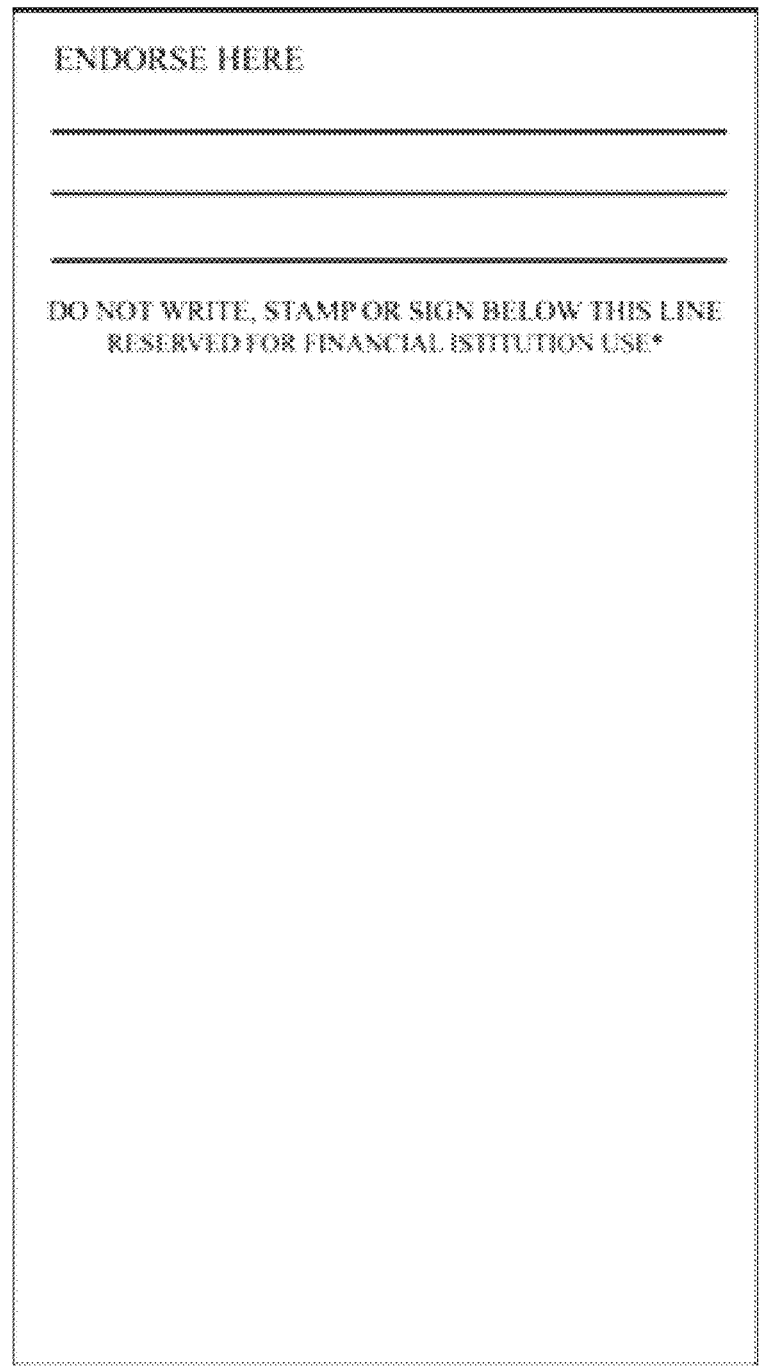
FIG. 3 is an image of a back side of a check depicting an endorsement region where an endorsement should be present, according to one exemplary embodiment.

FIG. 3 is an image of a back side 300 of a check, depicting an endorsement region 302 where an endorsement should be present, according to one exemplary embodiment.

Figure 4:
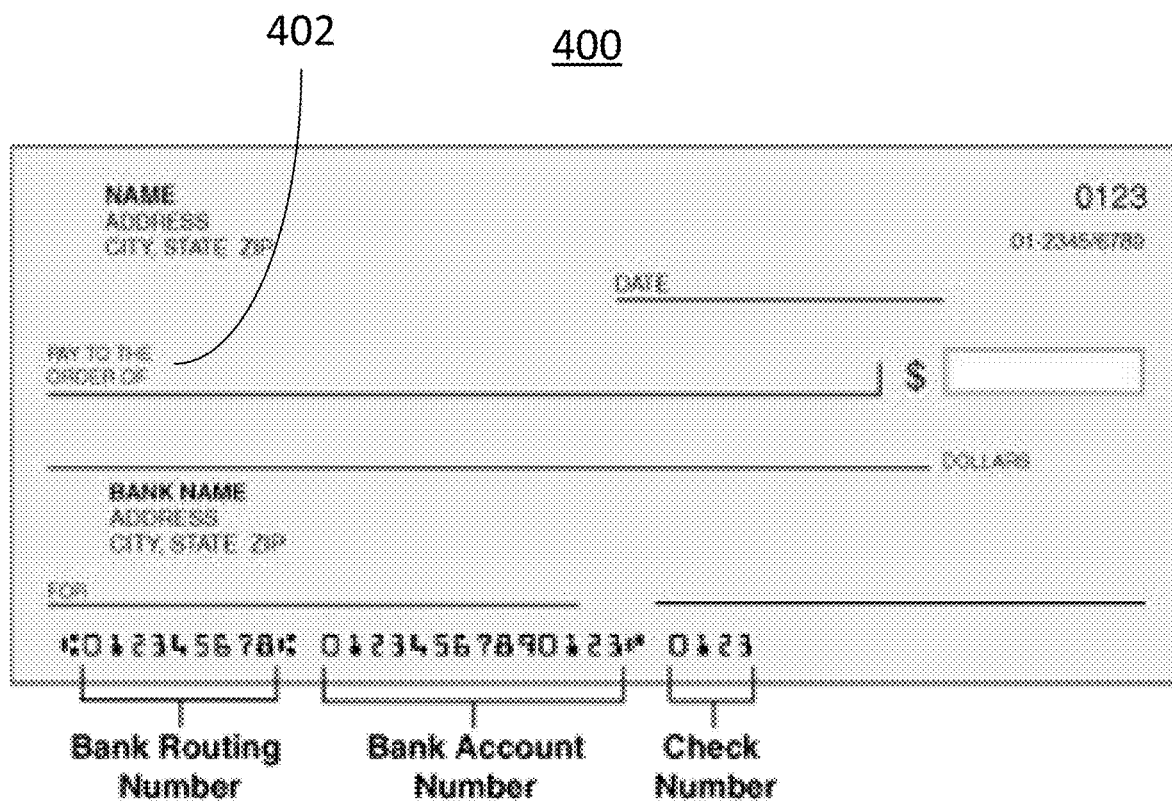
FIG. 4 is an image of a front side of a check depicting a payee field which can be compared with an endorsement to determine the authenticity of the endorsement, according to one exemplary embodiment.

FIG. 4 is an image of a front side 400 of a check, depicting a payee field 402 which can be used to compare with the identified endorsement in order to determine if the endorsement and the payee fields match.

According to some embodiments, the systems and methods for identifying content of a check can be integrated with one or more mobile applications that process mobile document images, such as mobile deposit applications for processing images of checks to be deposited into a bank account. According to an embodiment, the mobile application can run on the mobile device and can be integrated to use mobile image quality assurance functionality that is implemented on the mobile device and/or on a remote server. The mobile application can use the system for identifying content of a check to streamline the mobile deposit process.

MICR-Line Test

In one embodiment, an image of a check can be rejected if the MICR-line on the check cannot be clearly detected in the image. MICR stands for Magnetic Ink Character Recognition. Information can be printed on the front of a check in a special typeface using a special magnetized ink. Therefore, the MICR-line test is useful to determine which side of the check is in a check image before a region of interest (ROI) is selected. A MICR IQA test can use optical character recognition techniques to identify the MICR information on a check. If the MICR line on the front of the check is damaged, simply retaking an image of the check will not correct the defects in the image and the image will be rejected; however, if the MICR line was merely blurry or unreadable due to one or more of the factors described above, retaking the image after correcting one or more of factors may result in a high-enough quality image that the MICR line can be read from the check.

Figure 5:
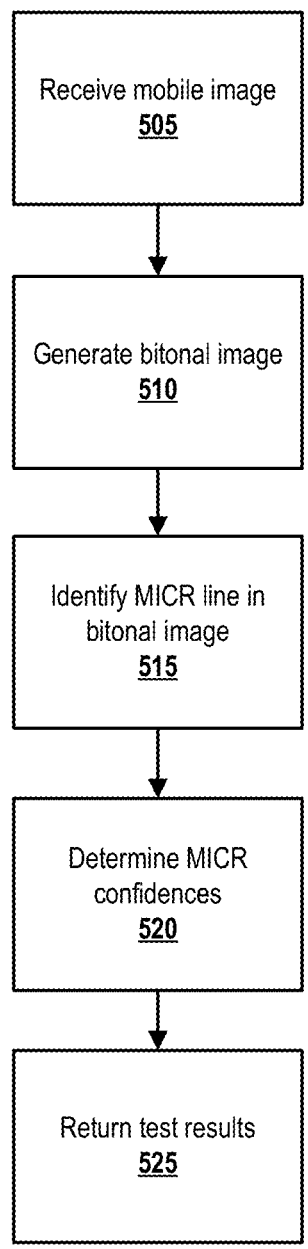
FIG. 5 is a method for testing the quality of a MICR (Magnetic Ink Character Recognition) line of the check image, according to an embodiment.

FIG. 5 illustrates a method for testing the quality of a MICR (Magnetic Ink Character Recognition) line of the check image, according to an embodiment. The MICR-line Test is used to determine whether a high quality image of a check front has been captured using the mobile device according to an embodiment. The MICR-line Test can be used in conjunction with a Mobile Deposit application to ensure that images of checks captures for processing with the Mobile Deposit information are of a high enough quality to be processed so that the check can be electronically deposited. Furthermore, if a mobile image fails the MICR-line Test, the failure may be indicative of incorrect subimage detections and/or poor overall quality of the mobile image, and such an image should be rejected anyway.

FIG. 5 is a flow chart of a method for executing a MICR-line Test according to an embodiment. A mobile image is received (step 505) and a bitonal image is generated from the mobile image (step 510). In an embodiment, preprocessing unit 108 extracts the document subimage from the check image as described above, including preprocessing such as geometric correction. The extracted subimage can then be converted to a bitonal snippet by the preprocessing unit 108. The MICR line is then identified in the bitonal snippet (step 515). According to an embodiment, a MICR recognition engine is then applied to identify the MICR-line and to compute character-level and overall confidence values for the image (step 520). These confidences can then be normalized to the 0-1000 scale used by the mobile IQA tests where 1000 means high quality and 0 means poor MICR quality. The confidence level is then returned (step 525). As described above, the test result value is provided to the testing unit 112 where the test result value can be compared to a threshold value associated with the test. If the test result value falls below the threshold associated with the test, detailed test result messages can be retrieved from the feedback and rules database 120 and provided to the user via the feedback unit 116 to indicate why the test failed and what might be done to remedy the test. For example, the user may simply need to retake the image to adjust for geometrical or other factors, such as poor lighting or a shadowed document. In some instances, the user may not be able to correct the errors. For example, if the MICR line on the document is damaged or incomplete and the document will continue to fail the test even if the image were retaken.

Front-as-Rear Test

Figure 6:
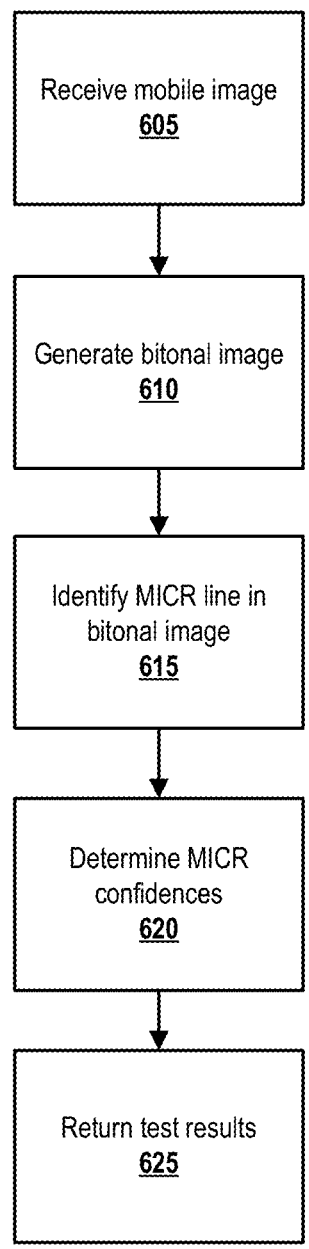
FIG. 6 is a method for testing the aspect ratios of front and back images of a check to test whether the images are of the same check, according to an embodiment.

FIG. 6 is a method for testing the aspect ratios of front and back images of a check to test whether the images are of the same check, according to an embodiment. A Front-as-Rear Test can be used to determine whether an image that is purported to be the back of a check is actually an image of the front of the check according to an embodiment. The Front-as-Rear Test is a check specific Boolean test. The test returns a value of 0 if an image fails the test and a value of 1000 if an image passes the test. If an MICR-line is identified on what is purported to be an image of the back of the check, the image will fail the test and generate a test message that indicates that the images of the check have been rejected because an image of the front of the check was mistakenly passed as an image of the rear of the check.

An image of the rear of the check is received (step 605) and the image is converted to a bitonal snippet by preprocessing unit 108 of the MCIPS 100 (step 610). A MICR recognition engine is then applied to identify a MICR-line in the bitonal snippet (step 615). The results from the MICR recognition engine can then be normalized to the 0-1000 scale used by the mobile IQA tests, and the normalized value compared to a threshold value associated with the test (step 620). According to an embodiment, the test threshold can be provided as a parameter to the test along with the with mobile document image to be tested. According to an embodiment, the threshold used for this test is lower than the threshold used in the MICR-line Test described above.

If the normalized test result equals or exceeds the threshold, then the image includes an MICR-line and the test is marked as failed (test result value=0), because a MICR line was identified in what was purported to be an image of the back of the check. If the normalized test result is less than the threshold, the image did not include a MICR line and the test is marked as passed (test result value=1000). The test results value is then returned (step 625).

Fraud Detection

Check fraud detection is based on Check Stock Analysis. A new check image's characteristics, which can include some or all of the ROI's described above, are compared to a reference database of the same account number containing the extracted characteristics of valid check images. Those characteristics are stored inside the Check Identity Record (CIR). It should be noted that the valid check images and the new check image can come from a mobile deposit capture application or from a Scanner, ATM, or from an in-branch capture. Essentially, any method that a bank uses to capture an image of a check can be used to generate the check images.

The fraud detection process is done in two main phases: The Training Phase, during which one or several reference images are defined which describe the reference check stock for each different account number. During this phase, a CIR corresponding to the account number is built. The second phase is the Test Phase, where a check image is compared to the CIR defined for the check's account number.

Fraud Detection can be used in 2 different scenarios: First, for a given account number, all checks belong to the same check stock (they have the same layout), or the embedding application is able to sort the training samples into several independent check stocks. Second, several different check layouts may co-exist inside the same CIR. During the verification process, the best matching image index inside the CIR can be returned.

Conventional check stock comparison uses a large list of different features, which can be individually enabled or disabled as illustrated in the following table.

| ID | Item | Compare Location | Compare Contents |
|---|---|---|---|
| 1 | Courtesy Amount Field | X | |
| 2 | Currency Sign | X | Image Comparison |
| 3 | Legal Amount Field | X | |
| 4 | Payee Name Field | X | |
| 5 | To the Order Of keyword | X | Image Comparison |
| 6 | Date Field | X | |
| 7 | Date keyword | X | Image Comparison |
| 8 | Payor's Address Block Field | X | |
| 9 | Check Number Field | X | |
| 10 | Reduced Image of the whole check | | Image Comparison |
| 11 | Structural layout analysis | Relative location of line objects | |
| 12 | Comparison of Check Number values on the check layout and inside the codeline data. | | No Check Stock reference used. |

-continued

| ID | Item | Compare Location | Compare Contents |
|---|---|---|---|
| 13 | Comparison of handwriting styles from the legal amount | | Compare style for some characters |
| 14 | Payer's name | X | Image Comparison |

At least some of these characteristics are illustrated in FIG. 9A-C. The verification of those items against their check stock reference may relate to the item location, or to the location plus content, and as noted the verification of these features can be individually enabled and disabled.

The principle of score (810) calculation is the following:
1. The local fraud score for each indicator is plotted on an x-y axis, and then each corresponding feature is plotted and the distance determined relative to the local fraud scores. This step would look like the following: Local fraud scores S(i), i=1-15, are evaluated for each of, e.g., 15 primitive fraud detectors. The score produced by the i-th primitive detector is the function of the minimum difference between the feature value F(i) of the incoming check and features R(i,j) of all reference checks from the CIR: S(i)=min {f(F(i)−R(i,j))}, i=1-15, j=1−N, N is the number of reference checks in the CIR. Example: Currency sign matching detector measures 4 local features F1=x-position of the sign, F2=y-position of the sign, F3=x-size of the sign, F4=y-size of the sign. It returns the score: Scur_sign=w*min{Σ|Fk−Rkj|}, k=1-4, j=1-N, where N is the number of reference checks in the CIR, w is normalization coefficient, Fk are currency sign features of the tested check, Rkj are corresponding features of the j-th reference check. This is illustrated in FIG. 10.
2. The Global fraud score (G) is then calculated as a normalized weighted product of local scores: G=(Π(S(i)+α(i)))^β, i=1-15, weights α(i) and β being adjusted manually or based on machine learning from a large data set to provide the best possible fraud detection rate. Typically, α(i) are small, approximately 0.03-0.005, and particularly approximately 0.01, and β is approximately 0.3-0.1, and particular approximately 0.2.

But as noted, the CIR needs to be updated in order to maintain a high level of confidence in the Global fraud score (G). For example, it is important to ensure that outliers and old documents are excluded to keep the model "fresh". Thus, the following algorithm can be used to update the CIR, in certain embodiments:
T1=Test new check S=f(min{d(F1, Rj)}), j=1,N; N is the number of ref. checks in CIR. This test ensures that the new check is within a valid range.
T2=Test new check against F with oldest check removed from CIR after F1 confirmed authentic (e.g., Global Score>700):
S=f(min{d(F, Rj2)}), j2=1,N; N is the number of ref. checks in CIR, with oldest check removed.
T3=Test new check against F with Max(d) check removed after F1 confirmed authentic (e.g., Global Score>700), where Max(d) represents the check that is furthest away from F1 on plot, i.e., least accurate:
S=f(min{d(F, (Rj3)}), j3=1,N; N is the number of ref. checks in CIR, with check having max(d) removed.

Then when: CIR Record N (number of checks)<10 then add new check to CIR. Otherwise, Score T1>=T2 and T3 and oldest check <180 days, then do not change CIR. When Score T1>=T2 and T3 and oldest check >=180 days, then replace oldest check in the CIR with new check (F1). When Score T2>=T3>=T1, then replace oldest check in eh CIR with F1. When Score T3>=T2>=T1 and oldest check <180 days, then replace Max(d) with F1. When the Score T3>=T2>=T1 and oldest check >=180 days, then replace oldest check with F1.

Thus, not only can the CIR be used to determine the likelihood of fraud for a new check, but the new check can also be evaluated, if determined to be authentic, to determine whether the features information associated with the new check would alter the CIR? If so, then the CIR can be updated with information from the new check. In this way, the CIR can consistently produce the most accurate determinations possible.

In certain embodiments, the CIR can be built up across a plurality of institutions, i.e., banks. In other words, the CIR can be constructed from images related to an account be retrieved from multiple different banks. This should significantly increase the velocity with which updates to the CIR are made and allow an even more accurate fraud detection capability.

Computer-Implemented Embodiment

Figure 7:
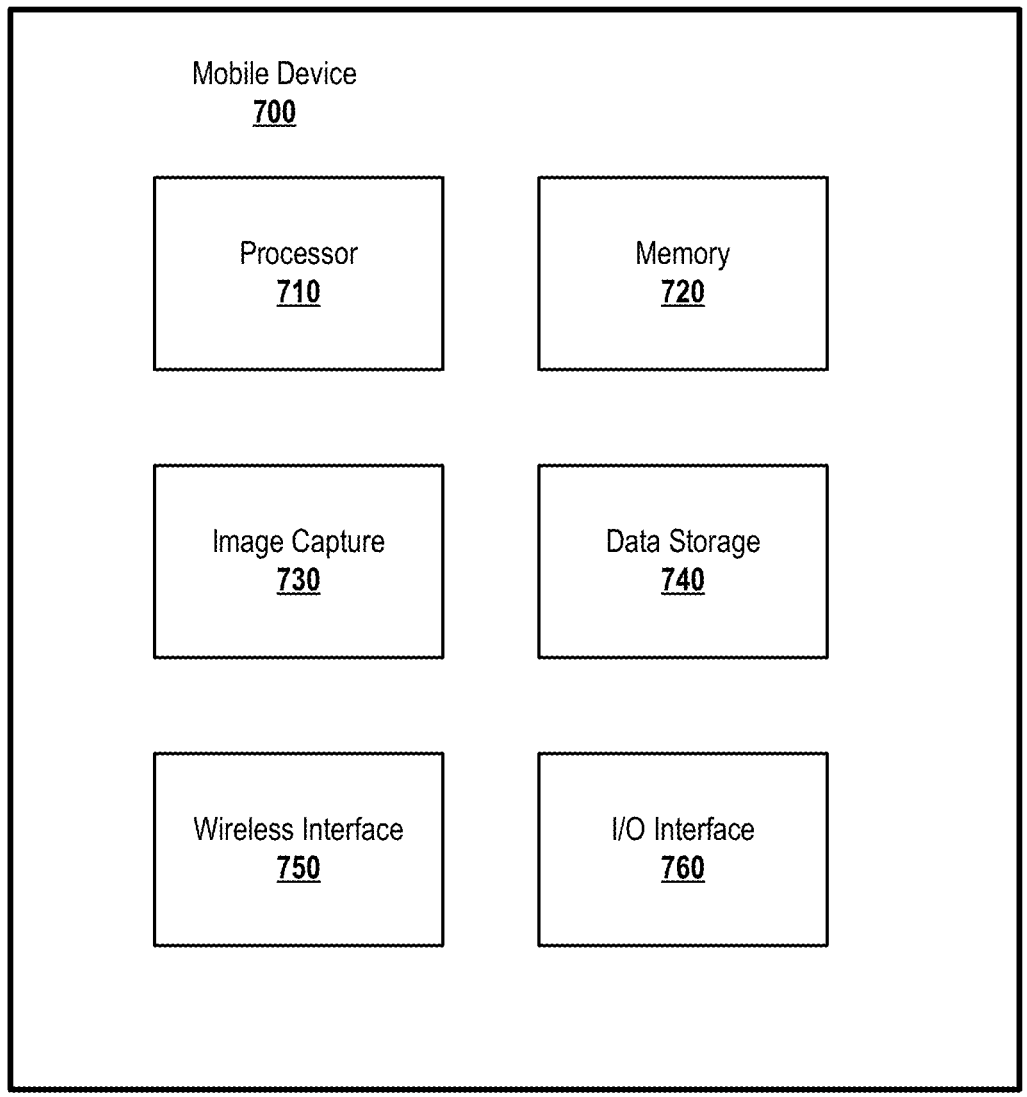
FIG. 7 is a block diagram of a computing device on which the mobile image quality assurance system described above can be implemented, according to an embodiment.
Figure 8A:
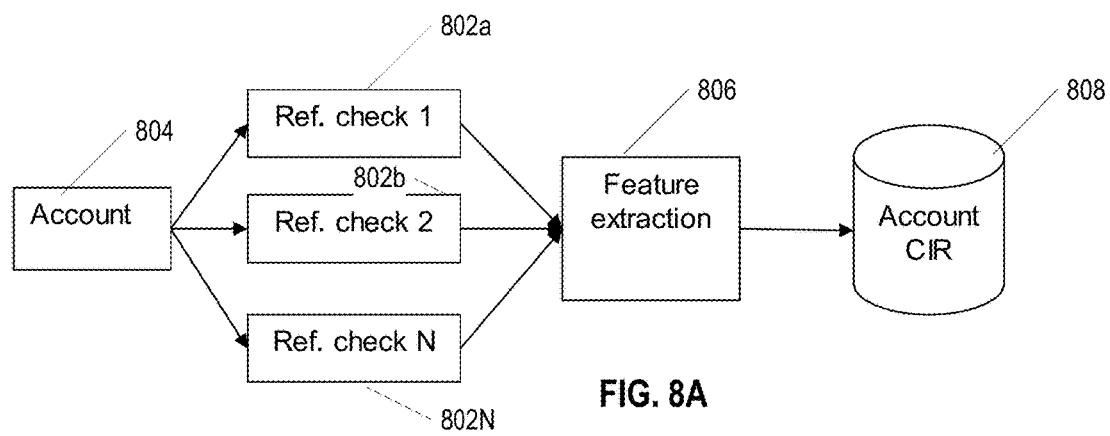
FIGS. 8A-B are diagrams illustrating example processes for fraud testing of checks.
Figure 8B:
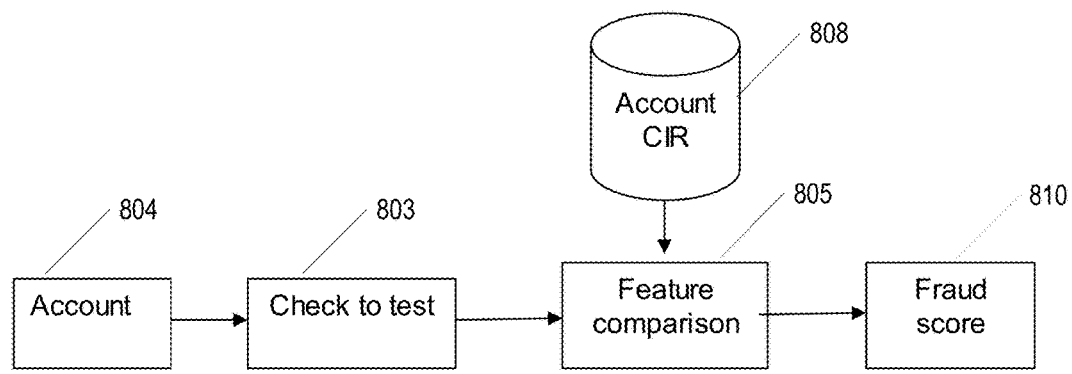

FIG. 7 is an exemplary embodiment of a mobile device 700 than can be used to implement the mobile IQA system described above according to an embodiment. Mobile device 700 includes a processor 710. The processor 710 can be a microprocessor or the like that is configurable to execute program instructions stored in the memory 720 and/or the data storage 740. The memory 720 is a computer-readable memory that can be used to store data and or computer program instructions that can be executed by the processor 710. According to an embodiment, the memory 720 can comprise volatile memory, such as RAM and/or persistent memory, such as flash memory. The data storage 740 is a computer readable storage medium that can be used to store data and or computer program instructions. The data storage 740 can be a hard drive, flash memory, a SD card, and/or other types of data storage.

The mobile device 700 also includes an image capture component 730, such as a digital camera. According to some embodiments, the mobile device 700 is a mobile phone, a smart phone, or a PDA, and the image capture component 730 is an integrated digital camera that can include various features, such as auto-focus and/or optical and/or digital zoom. In an embodiment, the image capture component 730 can capture image data and store the data in memory 720 and/or data storage 740 of the mobile device 700.

Wireless interface 750 of the mobile device can be used to send and/or receive data across a wireless network. For example, the wireless network can be a wireless LAN, a mobile phone carrier's network, and/or other types of wireless network.

I/O interface 760 can also be included in the mobile device to allow the mobile device to exchange data with peripherals such as a personal computer system. For example, the mobile device might include a USB interface that allows the mobile to be connected to USB port of a personal computer system in order to transfers information such as contact information to and from the mobile device and/or to transfer image data captured by the image capture component 730 to the personal computer system.

Thus, some or all of the features and functions described above can be implemented on a mobile device 700.

Figure 11:
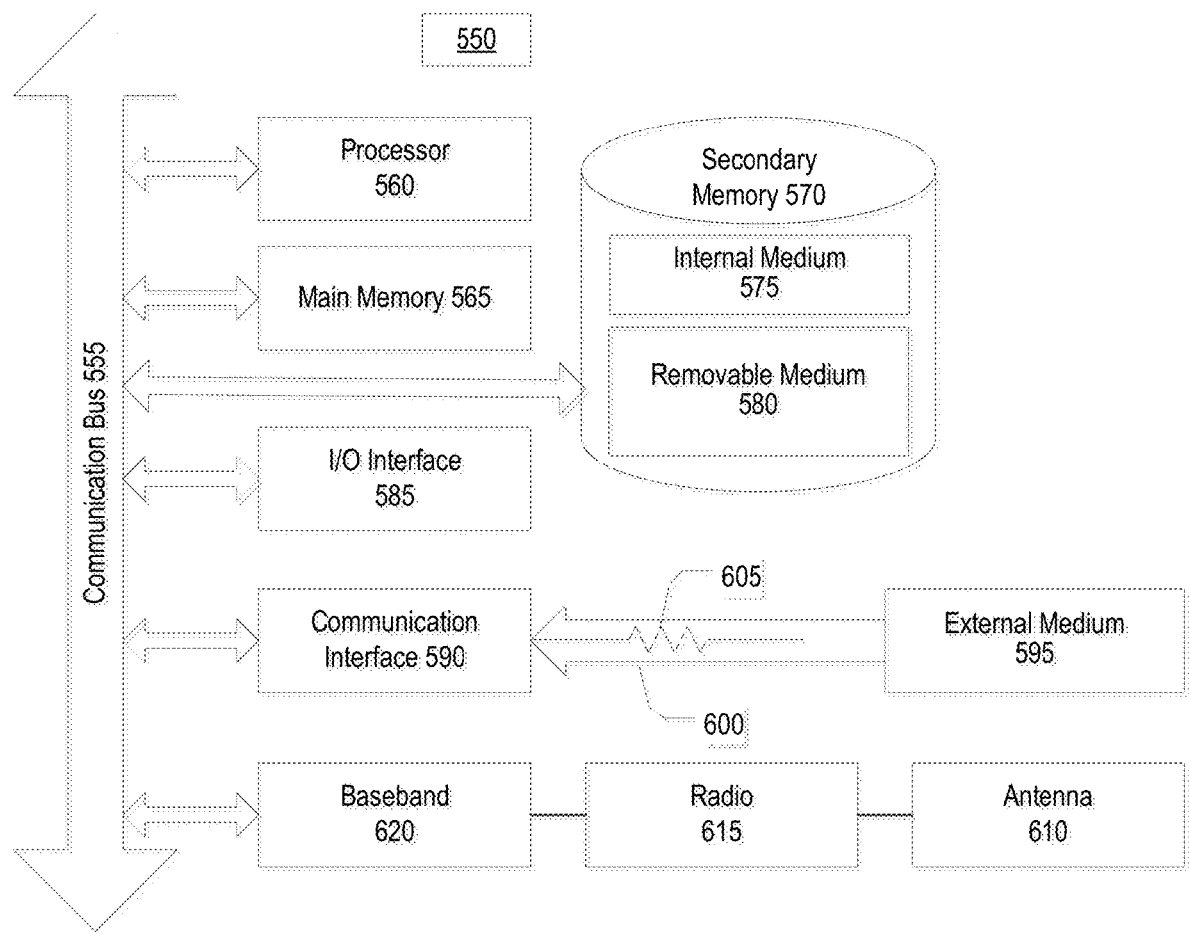
FIG. 11 is a block diagram illustrating an example wired or wireless system 550 that can be used in connection with various embodiments described herein.

FIG. 11 is a block diagram illustrating an example wired or wireless system 550 that can be used in connection with various embodiments described herein. For example the system 550 can be used as or in conjunction with one or more of mobile device 700, MCIPS 100, or the features, functions, or processes described above, and may represent components of device, the corresponding backend server(s), and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:
1. A system comprising:
a check Image Record (CIR) database configured to store, for each of a plurality of accounts, a CIR, wherein each CIR comprises feature information related to features extracted from a plurality of reference checks associated with the associated account of the plurality of accounts;
memory configured to store instructions; and
a processor coupled with the CIR database and the memory, the processor configured to run the instructions, which cause the processor to:
receive an image of a test check associated with an account of the plurality of accounts,
extract feature information from the image,
compare the features with the feature information stored in the CIR database for the account associated with the test check,
generate a fraud score, and
update each CIR by determining:
T1=Test for a new check S=f(min{d(F1, Rj)}), j=1,N;
T2=Test for the new check against the feature information in the CIR (F), determined with the feature information for the oldest check removed from the associated CIR after the feature information related with the new check (F1) is confirmed authentic, then S=f (min{d(F, Rj2)}), j2=1,N, wherein N is the number of reference checks for which feature information is included in CIR, but with the feature information associated with the oldest reference check removed; and

T3=Test for the new check against F with Max(d) check removed after F1 is confirmed authentic, where Max(d) represents the check that is furthest away from F1 on plot, S=f (min{d(F, Rj3)}), j3=1,N; N is the number of reference checks for which feature information is included in CIR, but with the feature information associated with the reference check having Max(d) removed.

2. The system of claim 1, wherein the instruction further cause the processor to update the CIR when N<10 by adding feature information related to the new check to the CIR, otherwise, when T1>=T2 and T3 and the oldest reference check is less than 180 days old, then not updating the CIR.

3. The system of claim 1, wherein the instruction further cause the processor to update the CIR when T1>=T2 and T3 and oldest check at least 180 days by replacing the feature information associated with the oldest reference check in the CIR with F1.

4. The system of claim 1, wherein the instruction further cause the processor to update the CIR when T2>=T3>=T1, by replacing the feature information associated with the oldest reference check in the CIR with F1.

5. The system of claim 1, wherein the instruction further cause the processor to update the CIR when T3>=T2>=T1 and oldest reference check is older than 180 days, by replacing Max(d) with F1.

6. The system of claim 1, wherein the instruction further cause the processor to update the CIR when T3>=T2>=T1 and oldest reference check is at least 180 days old, by replacing the feature information associated with the oldest reference check with F1.

7. The system of claim 1, wherein the feature information related with the new check (F1) is confirmed authentic when the Global score (G) is greater than a threshold value.

8. The system of claim 7, wherein the threshold value is 700.

9. The system of claim 1, wherein $\alpha(i)$ is approximately 0.01, and $\beta$ is approximately 0.2.

10. The system of claim 1, wherein the feature information is related to at least some of: a Courtesy Amount Position; Legal Amount Position; Payee name position; Date field position; Address block position; Check Number position; Currency sign position and currency sign image; Keyword "Date" position and image; Key-phrase "To The Order Of" position and image; Handwriting style features of the legal amount; Smoothed and reduced check image; Layout structural features—relative position of straight lines in the check image; Check number/codeline cross validation feature; Payer name position and image; and Client's signature image.

11. The system of claim 1, wherein the instructions further cause the processor to receive indications of which features to extract feature information.

12. The system of claim 1, wherein generating a fraud score comprises:
by generating a local fraud scores by evaluating S(i), i=1–M, for each of M primitive fraud detectors, wherein the local fraud score produced by the i-th primitive detector is the function of the minimum difference between the feature value F(i) of the test check and features R(i,j) of all of the plurality of reference checks associated with the account associated with the test check from the CIR database, where S(i)=min {f(F(i)−R(i,j))}, i=1–15, j=1–N, and N is the number of reference checks, and
generate a Global fraud score (G) as a normalized weighted product of local scores: $G=(\Pi(S(i)+\alpha(i)))^\beta$, i=1–15, wherein α(i) is in the range of approximately 0.03-0.005, and β is in the range of approximately 0.3-0.1.

13. A method for detecting fraud, comprising:
storing in a check Image Record (CIR) database, for each of a plurality of accounts, a CIR, wherein each CIR comprises feature information related to features extracted from a plurality of reference checks associated with the associated account of the plurality of accounts;
receiving an image of a test check associated with an account of the plurality of accounts,
extracting feature information from the image,
comparing the features with the feature information stored in the CIR database for the account associated with the test check,
generating a fraud score, and
updating each CIR by determining:
T1=Test for a new check S=f (min{d(F1, Rj)}), j=1,N;
T2=Test for the new check against the feature information in the CIR (F), determined with the feature information for the oldest check removed from the associated CIR after the feature information related with the new check (F1) is confirmed authentic, then S=f (min{d(F, Rj2)}), j2=1,N, wherein N is the number of reference checks7 for which feature information is included in CIR, but with the feature information associated with the oldest reference check removed; and
T3=Test for the new check against F with Max(d) check removed after F1 is confirmed authentic, where Max(d) represents the check that is furthest away from F1 on plot, S=f (min{d(F, Rj3)}), j3=1,N; N is the number of reference checks for which feature information is included in CIR, but with the feature information associated with the reference check having Max(d) removed.

14. The method of claim 13, further comprising updating the CIR when N<10 by adding feature information related to the new check to the CIR, otherwise, when T1>=T2 and T3 and the oldest reference check is less than 180 days old, then not updating the CIR.

15. The method of claim 13, further comprising updating the CIR when T1>=T2 and T3 and oldest check at least 180 days by replacing the feature information associated with the oldest reference check in the CIR with F1.

16. The method of claim 13, further comprising updating the CIR when T2>=T3>=T1, by replacing the feature information associated with the oldest reference check in the CIR with F1.

17. The method of claim 13, further comprising updating the CIR when T3>=T2>=T1 and oldest reference check is older than 180 days, by replacing Max(d) with F1.

18. The method of claim 13, further comprising updating the CIR when T3>=T2>=T1 and oldest reference check is at least 180 days old, by replacing the feature information associated with the oldest reference check with F1.

19. The method of claim 13, wherein the feature information related with the new check (F1) is confirmed authentic when the Global score (G) is greater than a threshold value.

20. The method of claim 19, wherein the threshold value is 700.

21. The method of claim 13, wherein α(i) is approximately 0.01, and β is approximately 0.2.

22. The method of claim 13, wherein the feature information is related to at least some of: a Courtesy Amount Position; Legal Amount Position; Payee name position; Date field position; Address block position; Check Number position; Currency sign position and currency sign image; Keyword "Date" position and image; Key-phrase "To The Order Of" position and image; Handwriting style features of the legal amount; Smoothed and reduced check image; Layout structural features—relative position of straight lines in the check image; Check number/codeline cross validation feature; Payer name position and image; and Client's signature image.

23. The method of claim 13, further comprising receiving indications of which features to extract feature information.

24. The method of claim 13, wherein generating a fraud score comprises:
by generating a local fraud scores by evaluating S(i), i=1–M, for each of M primitive fraud detectors, wherein the local fraud score produced by the i-th primitive detector is the function of the minimum difference between the feature value F(i) of the test check and features R(i,j) of all of the plurality of reference checks associated with the account associated with the test check from the CIR database, where S(i)=min {f(F(i)−R(i,j))}, i=1–15, j=1–N, and N is the number of reference checks, and
generating a Global fraud score (G) as a normalized weighted product of local scores: G=(Π(S(i)+α(i)))^β, i=1–15, wherein α(i) is in the range of approximately 0.03-0.005, and β is in the range of approximately 0.3-0.1.

* * * * *